United States Patent
Hart et al.

(12)

(10) Patent No.: US 6,516,940 B1
(45) Date of Patent: Feb. 11, 2003

(54) LOW ELECTROSTATIC DISCHARGE CONVEYOR

(75) Inventors: Steven L. Hart, Huntington, IN (US); Klaus P. Daenzer, Ft. Wayne, IN (US); Brent R. Howard, Ft. Wayne, IN (US)

(73) Assignee: Shuttleworth, Inc., Huntington, IN (US)

( * ) Notice: Subject to any disclaimer, the term of this patent is extended or adjusted under 35 U.S.C. 154(b) by 0 days.

(21) Appl. No.: 09/743,178

(22) PCT Filed: Jul. 29, 1999

(86) PCT No.: PCT/US99/17184

§ 371 (c)(1),
(2), (4) Date: Jan. 5, 2001

(87) PCT Pub. No.: WO00/06470

PCT Pub. Date: Feb. 10, 2000

Related U.S. Application Data

(60) Provisional application No. 60/136,414, filed on May 28, 1999, and provisional application No. 60/094,763, filed on Jul. 31, 1998.

(51) Int. Cl.[7] .............................................. B65G 13/06
(52) U.S. Cl. ..................... 198/781.1; 198/688; 198/692
(58) Field of Search .................. 198/781.1, 781.04, 198/781.02, 688, 691, 692; 193/35 A, 37, 35 R

(56) References Cited

U.S. PATENT DOCUMENTS

| | | |
|---|---|---|
| 3,171,535 A | 3/1965 | Harris |
| 3,587,524 A | 6/1971 | Keating et al. |
| 3,596,486 A | 8/1971 | Dolder |
| 3,690,646 A * | 9/1972 | Kolibas ...................... 198/691 |
| 3,878,933 A | 4/1975 | Bauer et al. |

(List continued on next page.)

*Primary Examiner*—Christopher P. Ellis
*Assistant Examiner*—Richard Ridley
(74) *Attorney, Agent, or Firm*—Woodard, Emhardt, Naughton, Moriarty & McNett LLP

(57) ABSTRACT

A conveyor (20, 120, 220, 320) for transporting objects sensitive to electrostatic discharge. In one embodiment, the present invention relates to a slippable roller conveyor (20, 120, 220, 320) with conductive slippable rollers (30, 30') in electrical communication with an electrical ground (60). The slippable rollers (30, 30') preferably have about $10^5$ ohms resistance from the outer surface (40) to the inner diameter (34) to ensure that electrostatic charges built up on the conveyed object can flow to ground, yet not flow too quickly. In another embodiment, the roller shafts (35) are supported on highly conductive bushings that provide a path to electrical ground that is preferably less than $10^4$ ohms. In yet another embodiment, the roller shafts (35) are driven by a conductive pulley (65) that minimizes the build-up of electrostatic charge as a result of a triboelectric effect with the drive belt (70).

31 Claims, 4 Drawing Sheets

U.S. PATENT DOCUMENTS

| | | | |
|---|---|---|---|
| 3,891,868 A | | 6/1975 | Joyce |
| 3,922,661 A | | 11/1975 | Enabnit et al. |
| 4,079,509 A | | 3/1978 | Jackson et al. |
| 4,196,805 A | * | 4/1980 | Banno ........................ 198/827 |
| 4,327,482 A | | 5/1982 | Araki et al. |
| 4,437,563 A | | 3/1984 | Oriol |
| 4,491,084 A | | 1/1985 | Marshall, Jr. |
| 4,573,430 A | | 3/1986 | Benson et al. |
| 4,793,459 A | | 12/1988 | Forknall et al. |
| 4,823,942 A | | 4/1989 | Martin et al. |
| 4,844,231 A | | 7/1989 | Usui |
| 4,867,098 A | | 9/1989 | Thorstenson |
| 4,917,226 A | | 4/1990 | Blöcker |
| 4,930,618 A | | 6/1990 | Roh |
| 4,983,148 A | * | 1/1991 | Nakagawa ................... 252/511 |
| 4,993,541 A | | 2/1991 | Roh |
| 5,040,669 A | | 8/1991 | Blöcker |
| 5,203,443 A | | 4/1993 | Toriumi et al. |
| 5,225,852 A | | 7/1993 | Uchida et al. |
| 5,261,754 A | | 11/1993 | Sugiura |
| 5,280,308 A | | 1/1994 | Takahashi et al. |
| 5,286,542 A | | 2/1994 | Susi et al. |
| 5,348,140 A | | 9/1994 | Clos |
| 5,348,164 A | | 9/1994 | Heppler |
| 5,425,611 A | | 6/1995 | Hughes et al. |
| 5,433,308 A | | 7/1995 | Gagnon |
| 5,452,801 A | | 9/1995 | Horn |
| 5,558,205 A | | 9/1996 | Helgerson et al. |
| 5,558,206 A | | 9/1996 | Helgerson et al. |
| 5,576,695 A | | 11/1996 | Minger et al. |
| 5,645,155 A | * | 7/1997 | Houghton ................. 193/35 R |
| 5,678,676 A | * | 10/1997 | Pierson ........................ 193/37 |
| 5,690,014 A | | 11/1997 | Larkin |
| 5,740,006 A | | 4/1998 | Larkin |
| 5,745,983 A | | 5/1998 | Quintana et al. |
| 5,875,878 A | * | 3/1999 | Pierson ..................... 193/35 B |
| 6,053,298 A | * | 4/2000 | Nimmo et al. ................ 193/37 |
| 6,112,875 A | * | 9/2000 | Gibson ................... 193/35 R |
| 6,148,991 A | * | 11/2000 | Meishner et al. ........... 198/780 |
| 6,161,673 A | * | 12/2000 | Nimmo et al. ................ 193/37 |

* cited by examiner

LOW ELECTROSTATIC DISCHARGE CONVEYOR

The present invention incorporates by reference U.S. Provisional Application Serial No. 60/136,414 filed May 28, 1999; and U.S. Provisional Application Serial No. 60/094,763, filed Jul. 31, 1998.

FIELD OF THE INVENTION

This invention relates to a conveyor apparatus. More particularly, the invention concerns a conveyor for transporting and conveying devices that are sensitive to electric fields and electrostatic discharges.

BACKGROUND OF THE INVENTION

The design and process improvements made in electronic manufacturing technologies such as computer disk drives, microprocessors and memories, and flat panel displays have, and will continue to force orders of magnitude improvement in the process controls of electrostatic discharge (ESD). Clean room material handling systems that support these processes are challenged to simultaneously improve cleanliness and ESD at increasing rates.

Clean room equipment was designed in the early-mid 1980's to operate satisfactorily in Class 1000 and 100 clean rooms, in the early 1990's to Class 10 requirements, and today to Class 1 environments (as defined by FED-STD 209E). Particle size constraints likewise became increasingly stringent, initially from 0.7, then to 0.5 micrometer, more recently to the 0.15 or 0.1 micrometer diameter sizes of today.

Electrostatic charge concerns associated with process equipments were identified by users in the late 1970's and early 80's. Three primary reasons for minimizing static charges are:

1.) Combustible materials or solvent vapors can be ignited by ESD generated arcs from surface potentials of 3000 volts or less.
2.) Dust is attracted by opposite polarity particle charging of a variety of non-conductive products such as plastics, tapes, and certain liquids.
3.) Static sensitive electronic components such as metal-oxide semiconductor (MOS) integrated circuits are vulnerable to ESD events.

Initial industry concerns were brought forth by the MOS semiconductor device producers, with early ESD limits of several hundred volts. These process related ESD requirements were met using rather traditional design and conductive material selections.

In the early 1990's, the disk drive industry began to develop requirements for material handling equipments with surface voltages of much less than one hundred volts. This more stringent specification included use of conductive and anti-static plastics, such as conductive PVCs, acetal with carbon black, conductive foams, and anti-static and hygroscopic materials. These materials were generally sufficient to meet most process applications in combined terms of cleanliness and ESD, but qualification criteria were becoming more stringent and qualification processes/ testing were taking much longer.

In late 1996, the disk drive industry began requesting conveyor surface voltages of twenty volts and less. An informal disk drive industry survey taken in early 1997 showed the simultaneous requirement developing for increased equipment cleanliness, and an order of magnitude reduction in conveyor surface voltage. The new "target" specification being set forth by disk drive manufacturers was pointing toward cleanliness of Class 1 to 10 at particle sizes less than 0.3 micron diameters; and a maximum ESD surface voltage of 5 volts.

Meeting these challenging equipment requirements meant that attention should be paid to surface and product interaction (particulation), surface to product triboelectric charge compatibility, material compositions and outgassing, surface conductivity and charge decay rates, and the sometimes simultaneous testing of critical parameters. In addition to traditional design and additional material concerns, techniques for low voltage measurements for products on moving conveyor surfaces were designed, tested and verified.

The EOS/ESD Association (Electrical OverStress/ElectroStatic Discharge) has established specific terminology associated with surface resistance:

Insulative: R=1 E $10^{11}$ ohms or higher. (S11.11)

Static Dissipative: R=1 E $10^4$ OHMS TO 1 E $10^{11}$ ohms (S11.11)

Conductive: R=0 ohms to 1 E $10^4$ ohms (S11.11)

Antistatic: R=n/a. Used to define non-triboelectric materials

However, the term "electrically conductive" as used herein includes the range of resistances from zero ohms to about $1 \times 10^7$ ohms.

Producing a low ESD conveyor utilizing slippable rollers is a challenge. Typically, the slippable rollers are fabricated from a synthetic material, chosen for low wear, low outgassing, low particulate creation, low noise, but which is electrically insulative. Some slippable roller conveyors have resistances from an outer diameter of a slippable roller to earth ground of $10^{12}$ ohms. Further, the drive pulleys for the roller shafts are chosen for good, long-term wear resistance when driven with a urethane belt. However, the synthetic materials typically chosen for drive pulleys and the urethane belts typically generate thousands of electrostatic volts from a triboelectric effect. Further, typical pulley materials are not electrically conductive.

What is needed is a slippable roller conveyor apparatus that protects the conveyed product from damaging levels of electrostatic discharge. The present invention does this in a novel and unobvious way.

SUMMARY OF THE INVENTION

One aspect of the present invention concerns a conveyor for moving objects. The conveyor includes a plurality of electrically conductive slippable rollers for supporting the objects. The slippable rollers are in electrical communication with a common electrical ground.

Another aspect of the present invention includes a conveyor for moving objects. The conveyor includes a plurality of electrically conductive, non-metallic pulleys that are in electrical communication with an electrical ground.

These and other aspects of the present invention will be apparent from the claims, description of the preferred embodiment, and the drawings to follow.

DESCRIPTION OF THE PREFERRED EMBODIMENT

Figure 1:
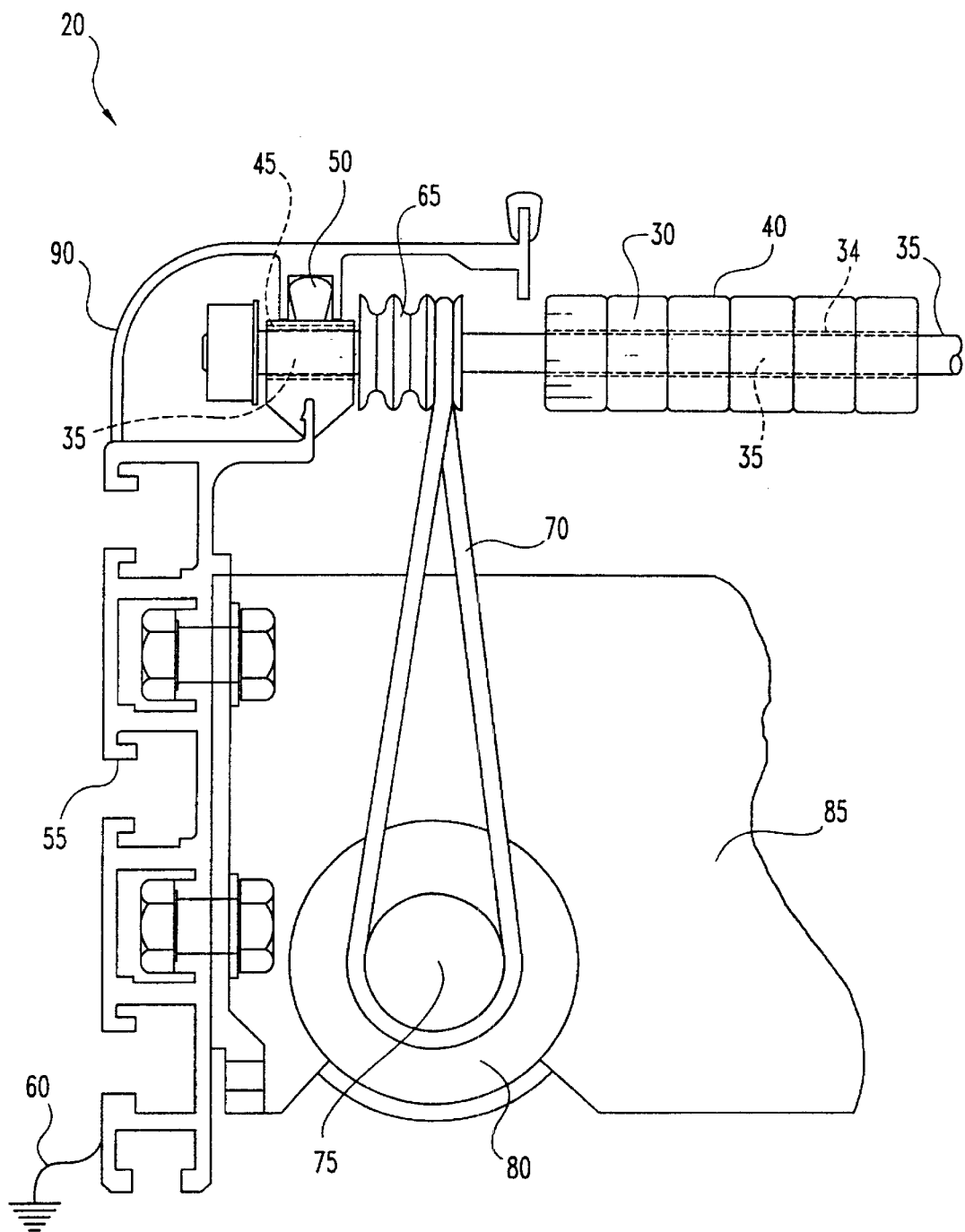
FIG. 1 is a cross-sectional view of a portion of a conveyor according to one embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention relates to conveyors for conveying objects, especially for conveying objects within a manufacturing setting. Some aspects of the present invention are preferably incorporated on conveyors that include slippable rollers in contact with the object being conveyed. However, the present invention is not limited to conveyors with slippable rollers. This application incorporates by reference other patent applications related to slippable roller conveyors assigned to Shuttleworth, Incorporated, including U.S. Patent Application Serial Nos. 60/061,106, 08/866,723, and 09/165,515, and Japanese Patent Application No. 180870/97. The features and concepts described herein for the present invention are also useful with the ergonomically designed conveyors, low particulate/vacuum-suctioned conveyors, and downward air flow conveyors in their various configurations described in the aforementioned patent applications.

The manufacturing process advances made in the semiconductor and computer disc drive industries have produced products that are unable to survive or withstand sudden in-rush currents as caused by charge-inducing electrostatic discharge (ESD) events. Submicron semiconductor features, magnetoresistive (MR) and giant magnetoresistive (GMR) head technologies include electronic components that can withstand only nanocoulonbs of charge and several volts of electromagnetic force (EMF). The physical movement of such devices, such as during production while being transported on a conveyor, without protection, can impart triboelectric charges that may catastrophically damage the units. Also, contact with a human operator can impart an electrostatic charge to the electrical device.

One embodiment of the present invention addresses these problems with an apparatus including a conveyor for moving the products and objects sensitive to ESD. In one embodiment, the conveyor includes a first electrically conductive path having a first electrical resistance from the outer diameter to the inner diameter of an electrically conductive slippable roller in contact with the object, in which the object may be a sensitive electrical device or a holding tray for the sensitive device. An electrostatic charge built up on the object is conducted through the first resistance to a second resistance. The second resistance includes a second electrically conductive path including an electrically conductive roller shaft, an electrically conductive bushing, and an electrically conductive supporting member. The electrostatic charge conducts from the second resistance to an electrical ground, such as an earth ground, after flowing through the second conductive path. The term "electrically conductive" as used herein includes the range of resistances from zero ohms to about $1 \times 10^7$ ohms.

In another embodiment of the present invention, there is an apparatus which includes a conveyor with a roller shaft drive mechanism that is arranged and configured so as to not be a significant generator of triboelectric charges. In one embodiment, the roller shaft driving means includes an electrically conductive pulley coupled to an electrically conductive roller shaft for driving the roller shaft. A belt drives the pulley from a line shaft, electrical motor, or other means. In another embodiment of the present invention, the object being conveyed is shielded from the triboelectric field generated by the pulley and the belt by one or more electrically conductive covers and static support members.

In yet another embodiment of the present invention, triboelectric charges are kept to a minimum by fabricating both the belt which drives the pulley and the pulley from similar material, such as related types of urethane, in which the use of similar materials reduces or eliminates the triboelectric effect.

In yet another embodiment of the present invention, the devices sensitive to ESD are protected during their transport on a conveyor by tailoring the electrical resistance of the conveyor to earth ground. In one embodiment, the conveyor includes a plurality of driven slippable rollers, the surfaces of which contact the object being conveyed. In this embodiment of the present invention, the electrical resistance from the surface of the slippable rollers to the roller shaft is more than about one hundred thousand ohms and less than about ten million ohms. Preferably, the electrical resistance of a slippable roller is more than about one hundred thousand ohms and less than about two million ohms, and most preferably, the slippable roller to roller shaft resistance is more than about three hundred thousand ohms and less than about eight hundred thousand ohms. In this embodiment, the electrical resistance from the roller shaft to earth ground is preferably a low number, such as ten thousand ohms or less. Having a ground path from the conveyed object to ground that has too little resistance can result in damage to the product. With too little resistance, any charge that has built up on the conveyed object travels to ground too quickly. This can result in high current flow within the product, since current is defined as the rate of change of electrical charge with respect to time. The high current flow can damage sensitive electronic devices.

It is believed that roller to roller shaft resistances lower than those mentioned can lead to high current flow and possible sparking within the conveyed object because the resistance to earth is too low to sufficiently slow the flow of electrical charge. Further, the presence of low resistance from the surface of the slippable rollers to earth ground may also be a hazard to nearby operators that are in contact with the slippable rollers and nearby voltage sources used for powering tools, soldering, and related activities, and who may be shocked and injured by the large flow of electrical current. A slower flow of the electrical charge is also useful in minimizing electrical fields which may be induced by the flow of charge. However, conductive paths from the object to earth ground with resistances greater than those previously mentioned may also cause ESD events by slowing the flow of charge too much, such that high voltage fields are created.

Further, it is believed preferable that the slippable rollers present about $10^5$ ohms resistance, followed by shaft to ground interface with a relatively low resistance of about $10^4$ ohms or less to ground. The higher resistance of the slippable rollers minimizes high current damage in the conveyed object, and the low resistance from the slippable roller inner diameter to ground prevents any build-up of charge in the roller shaft, bushing, or bushing holder that would otherwise "back-up" the charge being released from the conveyed object into the rollers.

There are varying goals for a low electrostatic discharge conveyor, depending upon the industry and product: (1) some semiconductor foundry front ends generally require Class 1 cleanliness at ESD levels of about 50–100 volts for their material handling equipments; (2) semiconductor foundry back ends generally require Class 10 to 100 cleanliness at ESD levels of about 50 volts for assembly, packaging and test operations; (3) disk media manufacturers generally require Class 10 cleanliness at ESD voltage levels of about 100 volts to discourage the attraction of particles to the media surface; (4) disk drive manufacturers require Class 10 cleanliness, but less than about 5 volts ESD for selected operations and desire reduced ESD levels, and (5) flat panel glass manufacturers sometimes need Class 10 to 100 cleanliness, and generally can withstand ESD levels of several hundred volts.

To achieve Class 1 cleanliness in ESD levels less than about 5 volts, it is preferable that: (1) new conductive materials should demonstrate equal or better wear properties of less conductive materials being replaced; (2) roller materials should not transfer to the product (i.e., no visible marking or sloughing); (3) roller material resistivity should be from about $1\times10^5$ ohms to about $1\times10^7$ ohms; (4) bushing and bushing holder materials resistivity should preferably be less than $10^4$ ohms; (5) triboelectric charging resulting from the belt drive mechanisms should be minimized or eliminated.

Conveyors are known to employ a variety of plastics, stainless steels and extruded aluminum materials in their construction. Ultra low ESD levels (<10 volts) preferably have resistive paths from about $1\times10^5$ ohms to about $2\times10^6$ ohms from conveyor surface to chassis ground. However, resistances that are too low can also cause rapid discharging of highly charged products. There should be proper combinations of materials for each conductive component, while maintaining acceptable cleanliness.

The stainless steel shafting and aluminum frame elements are typically conductive. The polymer components suitable for long-term, highly reliable use in a clean room environment, in contrast, tend to be insulative. These components include rollers, bushings and seals, bushing holders and pulleys. Criteria for selecting polymers for these components include the following: wear resistance, lubricity, high electrical conductivity (low resistivity), ultra cleanliness, low outgassing, and operational quietness.

In developing components and materials for the present invention, currently used materials were evaluated according to the criteria listed above, identifying acceptable and unacceptable characteristics of each component and material. Additives to the materials were evaluated for their effect in improving particular criteria. In some cases, it was found that, for example, conductivity could be improved, but with a reduction in cleanliness. In other cases, certain materials and additives achieved satisfactory wear, cleanliness, and conductivity, but introduced unacceptable squealing or noise. As a result, some base materials were abandoned and other recently developed materials heretofore not applied to conveyors were evaluated. The evaluation included pin-on-disk testing to evaluate life and wear rates.

The present invention further includes drive pulleys 65 compatible with the previously listed criteria. To meet the very low voltage requirements (less than about 1 or 2 volts) for the disk drive industry, it is preferable to change the triboelectric relationship between the urethane drive belt and nylon drive pulley. It is preferable that the pulley be conductive so as to drain charge away from the drive belt. One embodiment of the present invention includes the use of a conductive, reinforced nylon material for the drive pulleys. This material forms a highly conductive pulley that carries away charge developed at the drive belt to pulley interface. This pulley fabricated from a synthetic material made highly conductive is preferably injection molded. The injection-molded pulley provides a significant cost advantage over a cast and/or machined metallic pulley.

In another embodiment of the present invention, an electrically conductive pulley 65 is fabricated from a preferred compound comprising about 40% mineral reinforcement and about 60% nylon 6,6, and which is sold under the designation Vydyne R-100 by the Monsanto Chemical Group of the Monsanto Company of St. Louis, Mo., to which about 3–5% conductive microfibers are added. Those of ordinary skill in the art will recognize that the present invention also contemplates the use of graphite or carbon black as a conductive additive to the pulley base material.

One example of conductive microfibers are carbon fibrils, such as those produced by Hyperion Catalysis of Cambridge, Mass. These carbon fibrils are grown fibers resembling microtubes. Another example of conductive microfibers are carbon microfibers fabricated to a short length, such as about 100 to 200 microns, by a method such as milling, one example being those used by RTP Company of Winona, Minn. As used herein, the term "conductive microfibers" encompasses both carbon fibrils and carbon microfibers as disclosed above, and also their equivalents as would be known to one of ordinary skill in the art.

These conductive fibers are mixed with synthetic materials, such as nylon 6,6, polypropylene sulfide, polyoxymethylene (acetal), and other synthetic materials known to one of ordinary skill in the art to make those synthetic materials more conductive. After mixing, these conductive microfibers lay in between the molecular boundaries within the synthetic material, and are known, in some cases, to join mechanically at the molecular boundaries. The resultant material thus maintains the properties of the synthetic material, such as low outgassing, wear resistance, thermal stability, and other properties, and can also have a tailored amount of electrical conductance.

The use of conductive microfibers in this manner is different than the use of conductive coatings. A component with an electrically conductive coating on the outer diameter, for example, would conduct along the outer diameter, but could still be largely insulative between the outer diameter and an inner diameter. In contrast, mixing conductive microfibers, graphite, or carbon black with synthetic materials results in components that are conductive through the volume of the component.

Materials chosen for rollers 30 are preferably chosen from material families that exhibit little outgassing, since the rollers are always exposed to the air in the clean room. In development of the present invention, rollers were tested for their low ESD properties by measuring resistance from the roller inner diameter to the roller outer diameter, such as with a mega-ohm meter. Preferably, resistance from the roller inner diameter to the roller outer diameter should be from about one hundred thousand ohms to about two million ohms so as to minimize or prevent rapid charge migrations from products and objects in contact with the conveying surface of the conveyor, since a rapidly migrating charge may induce its own damaging field, cause sparking in the conveyed product, or burn sensitive portions of the conveyed product. Some embodiments of the present invention include a roller resistance from about one hundred thousand ohms to about ten million ohms It is also preferable that the triboelectric relationship between the slippable rollers and the products or objects result in little or no build-up of electrical charge. During development of the present invention, this triboelectric relationship was measured with a non-contact electrostatic volt meter. In a most preferred embodiment, the shippable rollers are fabricated from a highly conductive, lubricated acetal material which has excellent wear resistance, a low coefficient of friction, little outgassing, and little or no generation of particulate matter. The compound should also be compatible and wear resistant with a wide variety of clean room products and carriers, including PEEK-based polymers, often used in Class 1 environments. A preferred material for an electrically conductive slippable roller as herein described is a mixture of about 80% polyoxymethylene (acetal), with about 10% polytetrafluoroethylene (PTFE), and about 10% carbon black. One example of this material sold by the RTP Company is RTP ESD 800-10. Those of ordinary skill in the art will recognize that the present invention also contemplates the use of conductive microfibers as a conductive additive to the roller base material.

The present invention also includes material for bushings 45 consistent with the previously mentioned criteria. It has been known to use a conductive foam strip between a roller shaft and the frame to provide a conductive path. However, conductive foams previously used tended to wear and require periodic replacement. If the conductive foam wore excessively, an air gap between the foam and the roller shaft would be created, which would interfere with the path to ground.

To permit the removal of the conductive foam, the present invention includes a conductive bushing to support the rotating roller shaft from the frame and provide a conductive path. One embodiment of the present invention includes a highly conductive polyphenylene sulfide (PPS) material for the bushings. The PPS shows exceptional wear resistance, almost no particulation, is internally lubricated, and is ultra-clean, dimensionally stable and abrasion-resistant. The use of a synthetic material with internal lubrication permits the elimination of external lubricants such as grease, which would interfere in the ground path from the roller shaft to the bushing.

In one embodiment, the bushing material is a mixture of about 70% PPS, about 3–5% conductive microfibers, and the remainder PTFE, such as the material sold under product code BSP XT-157 Gray, sold by Bay State Polymer Distribution, Incorporated of Bay Village, Ohio. Another example of a conductive bushing material is a mixture of about 83% PPS, about 5% mineral oil, about 2% carbon, and about 10% PTFE, as sold by the grade GANPLA PPS-L-L (S), sold by Sumitomo Electric Industries, Ltd. of Osaka, Japan. Yet another example of bushing material is a mixture of about 19% PTFE, about 19% low-density polyethylene (LDPE), about 5% carbon black, and the remainder PPS, as sold by the RTP Company as Formula 1399X82389. A preferred material for the bushings is a mixture of about 65% liquid crystal polymer, about 10% PTFE, about 10% carbon, and about 15% graphite, as sold by the RTP Company as Formula 3499X76251.

The present invention also includes a bushing holder which is compatible with the criteria listed above. In one embodiment of the present invention, the bushing holders have a resistance of about $10^3$–$10^4$ ohms between critical points, such as between the bushing holder inner diameter and the features that couple the bushing holder to the conveyor frame. In one embodiment of the present invention, the bushing material is a polypropylene, impact modified, conductive bushing holder material, exhibiting excellent deflection temperature capability, and wear resistance. A preferred embodiment of the present invention include a bushing holder fabricated from stainless steel.

It is also preferable to enclose the drive pulley 65 and drive belts 70 in a conductive, shielding Faraday cage to provide EMI protection and limit the extent of the electrostatic field. Most preferably, the Faraday cage also serves as an evacuated plenum from which any particulate matter generated by the drive system components is removed.

After extensive testing, including wear testing, particulate testing, friction testing, and ESD testing, the preferable combination of aforementioned materials resulted in a conveyor with surface voltages of about 1 volt peak to peak or less. The testing included pallet loadings (simulating different products) from 0.25 kg to 4 kg, travelling at about 0.5 meters per second. It is possible that some of the charge measured comes from a combination of triboelectric generation, galvanic generation, and capacitive effects due to the non-perfect planar nature of the conveyor surface.

FIGS. 1, 2, 3, and 4 depict cross sectional views of portions of conveyors 20, 120, 220, and 320, respectively, adapted for conveying objects in one or more directions. The present invention includes conveyors with a plurality of roller shafts rotating in the same direction, each roller shaft thereby driving a least two slippable roller rotating in the same direction. The present invention also includes conveyors with a plurality of roller shafts rotating in opposite directions and arranged in an alternating pattern, such that objects can be transported in a first direction by a first group of shafts rotating in one direction, and then transported in an opposite direction by a second group of shafts rotating in the opposite direction. Objects, which include both electrical components and also carriers of electrical components, that are in contact with the slippable rollers are transported in a particular direction, unless the motion of the object is resisted. Resistance to motion results in slippage of the rollers on the roller shaft because of the relatively low friction between the roller shaft outer diameter and the slippable roller inner diameter. Additional description of slippable roller conveyors is provided in U.S. Patent Application Serial Nos. 60/061,106, 08/866,723, and 09/165,515, and Japanese Patent Application No. 180870/97, included herein by reference.

Figure 2:
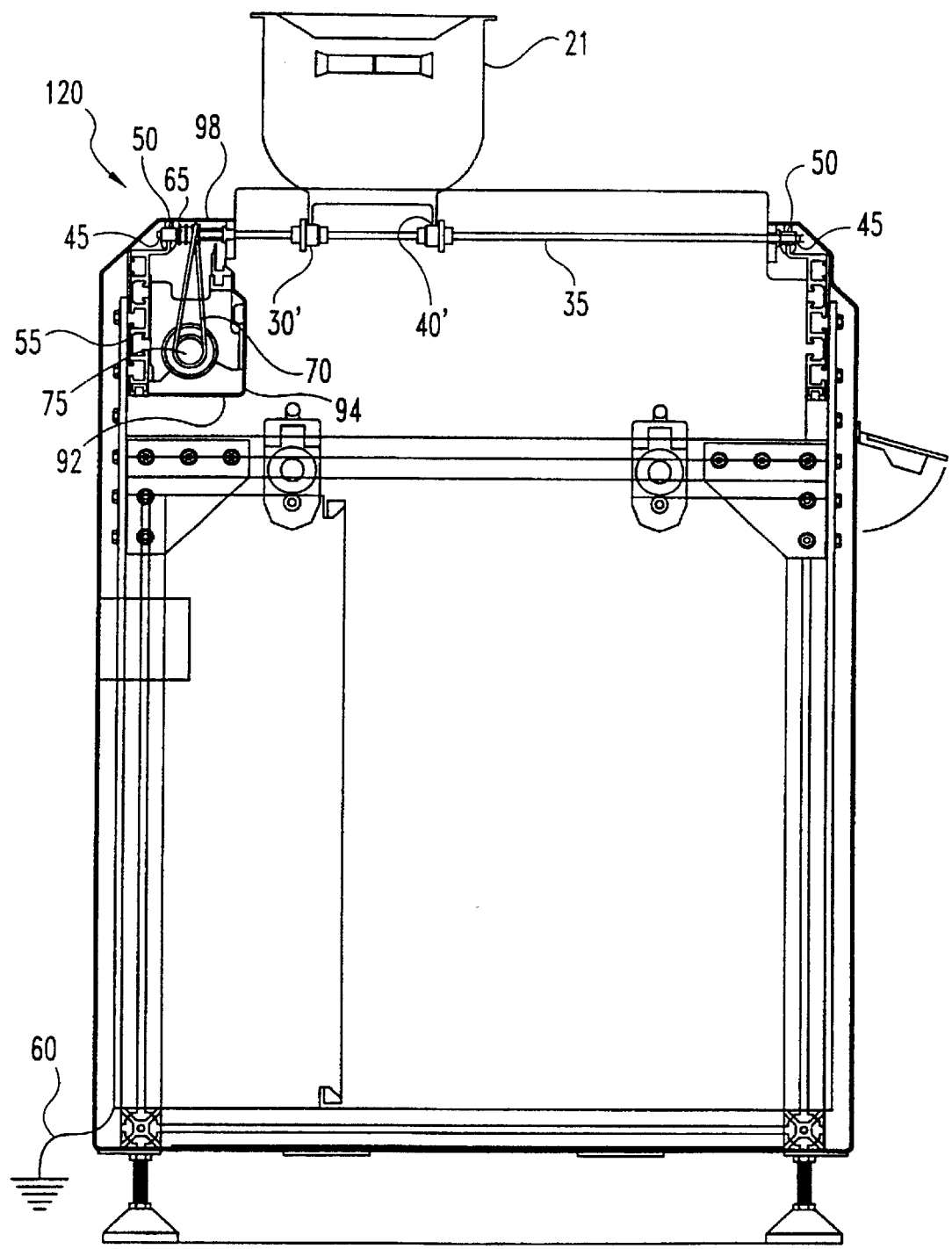
FIG. 2 is a cross sectional view of a portion of a conveyor according to another embodiment of the present invention.

A portion of a conveyor 20 incorporating one embodiment of the present invention is depicted in FIG. 1. One or more preferably slippable electrically conductive rollers 30 are supported by an electrically conductive roller shaft 35. Electrically conductive rollers 30 are preferably round and have an outer surface 40 that provides a conveying surface path for an object 21 (as shown in FIG. 2). Although electrically conductive rollers 30 have been described as slippable, they may also be non-slippably coupled to electrically conductive roller shaft 35 by the inner diameter 34 of roller 30. Each roller 30 preferably has a resistance, when measured from surface 40 of the roller outer diameter to roller inner diameter 34, of more than about $1\times10^5$ ohms and less than about $2\times10^6$ ohms.

Figure 3:
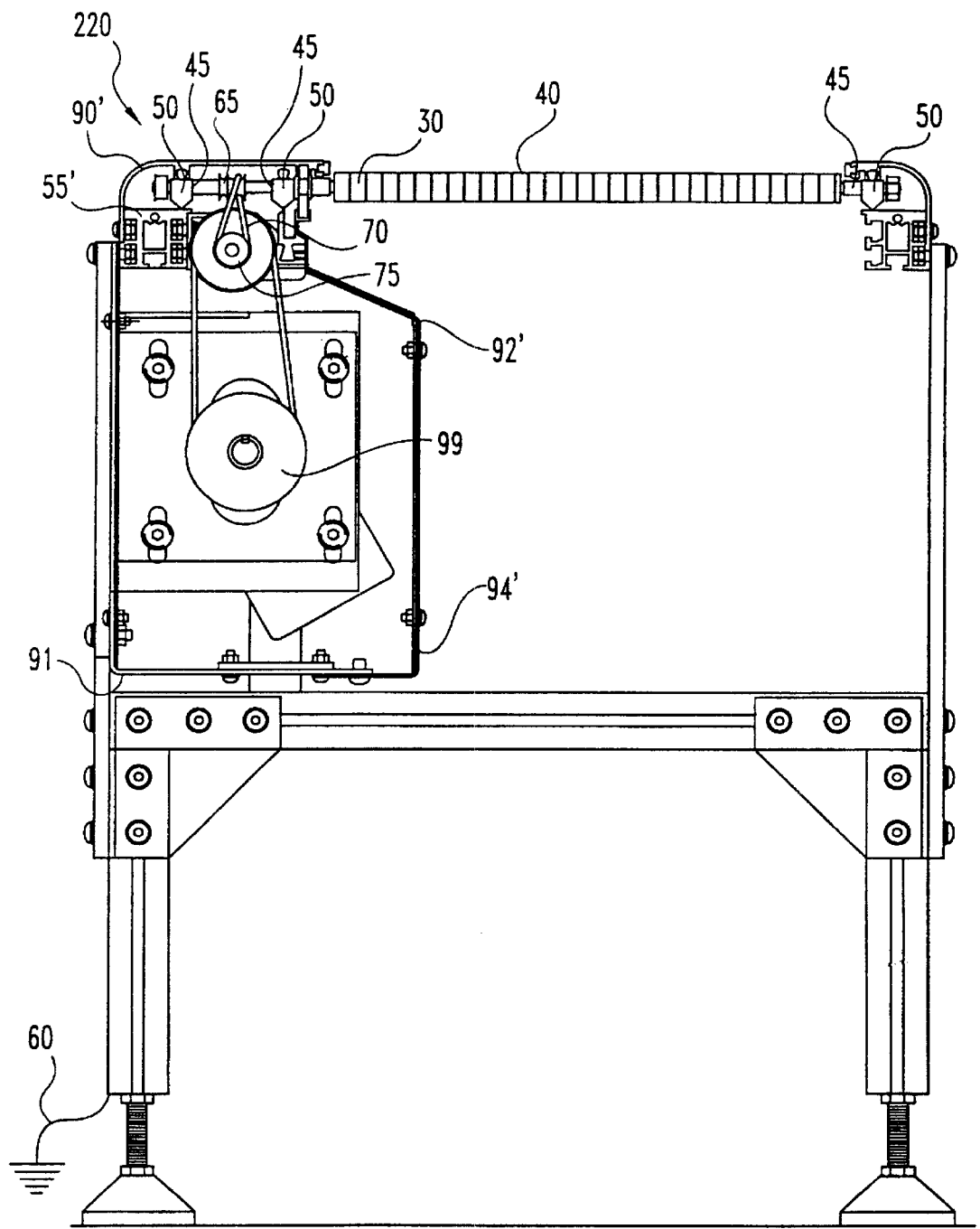
FIG. 3 is a cross sectional view of a portion of a conveyor according to another embodiment of the present invention.

One end of electrically conductive roller shaft 35 is rotatably supported by an electrically conductive bushing 45. Bushing 45 is supported within electrically conductive bushing holder 50. Bushing holder 50 is in turn supported by electrically conductive static support member 55. The other end of roller shaft 35 is preferably supported by a bushing, bushing holder and static support member similar to that described, as is shown in FIGS. 2 and 3. Although bushing holder 50 has been shown and described as a component separate from static support member 55, those of ordinary skill in the art %will recognize that the bushing 45 may also be supported by a bushing holder that is integral with static support member 55.

The apparatus that is described includes an electrically conductive path from the conveying surface to ground, including a resistance from the object to roller shaft 35 of more than about $1\times10^5$ ohms and less than about $2\times10^6$ ohms, and a resistance of less than $1\times10^5$ ohms from the roller shaft to ground. An electrical charge on a sensitive device or object being conveyed flows in a conductive path of surface 40 of roller 30, on and through roller shaft 35, on and through bushing 45, and through bushing holder 50 through static support member 55 preferably to an earth ground 60, or other ground. However, those of ordinary skill in the art will recognize alternative embodiments for the ground path that are encompassed by the present invention. For example, the electrical charge flowing from a sensitive device through surface 40 of roller 30 to roller shaft 35 may also be sent to ground 60 directly, such as by a conductive slip ring in contact with roller shaft 35 and also in contact with ground 60.

To maintain a low resistance conductivity path from the conveying surface to ground, the components between the conveying surface and ground are preferably conductive. Roller shafts 35 and bushing holders 50 are preferably fabricated from a conductive stainless steel. Bushing 45 is preferably fabricated from a mixture of synthetic materials as previously described. The resistance of bushing 45 from its internal diameter, in contact with the outer diameter of shaft 35, to the outer diameter of bushing 45, in contact with bushing holder 50, is preferably less than about $1\times10^5$ ohms, and most preferably less than $1\times10^4$ ohms. In one embodiment of the present invention, bushing 45 includes most of the resistance in the ground path from shaft 35 to ground 60. However, the present invention also contemplates bushings 45 which are metallic, and would therefore have a greatly reduced resistance in comparison to a bushing fabricated from synthetic material. In a preferred embodiment, bushing 45 is a generally cylindrical plain bushing fabricated from any of the synthetic mixtures previously described, or their equivalents known to those of ordinary skill in the art. Further. the present invention contemplates those embodiments in which bushing 45 is metallic, including roller bearings and ball bearings.

The use of conductive microfibers has been found to permit the conveyor components of some embodiments of the present invention to be fabricated with low resistivity while retaining other physical properties, such as being non-particulating, non-sloughing, and non-outgassing, and also retaining adequate strength and wear properties. These properties are useful for conveyors in applications such as clean rooms with a rating of Class 10 or cleaner, as defined by Federal Standard 209E. Unlike other conductive additives that would need to be added in large percentages so as to reduce the component resistivity, conductive microfibers produce a sufficient decrease in resistivity at low percentages. Thus, by adding only small amounts of conductive microfibers it is possible to increase electrical conductivity yet maintain other physical and chemical properties of the base material with little or no change. However, those of ordinary skill in the art will recognize that some base materials achieve acceptably low resistance with the addition of carbon black or graphite instead of conductive microfibers, and still possessing other acceptable physical and chemical properties.

In some embodiments of the present invention it is desirable to maintain resistance from roller surface 40 to roller shaft 35 above a particular minimum resistance. In those embodiments the weight percentage of carbon or conductive microfiber in one or more components may be decreased so as to have the desired overall resistance.

Roller shaft 35 is preferably fabricated from a stainless steel. Static support member 55, which is preferably a portion of the conductive path to ground, is preferably fabricated from aluminum, stainless steel, or conductive plastic. Earth ground 60 preferably connects static support member 55 to ground, although earth ground 60 may instead be connected to other portions of the conductive path, such as to bushing holder 50.

Another aspect of the present invention pertains to reducing or eliminating triboelectric sources within the conveyor. As shown in FIG. 1, one end of roller shaft 35 is coupled to one or more drive pulleys 65, such as by a keyway (not shown). A drive belt 70 driven by drive shaft, or lineshaft, 75 rotates pulleys 65 and subsequently causes roller shafts 35 and thereby rollers 30 to rotate in a manner well-known in the art. The present invention contemplates those embodiments in which each pulley 65 is driven by a belt 70 from drive shaft 75, and also those embodiments in which one or more pulleys 65 are driven by belts 70 which are driven by other adjacent pulleys 65. Drive shaft 75 is preferably supported within a metallic ball bearing 80 that fits within a bearing mount 85 supported by static support member 55, although the present invention also contemplates other types of bearings for supporting drive shaft 75, such as bearings formed from synthetic materials, and plain and roller bearings.

In one embodiment of the present invention, pulleys 65 are electrically conductive. Being electrically conductive, pulleys 65 are less likely to have damaging charges and voltages built up on the pulley surfaces as a result of slippage and contact between pulleys 65 and drive belt 70. Although the slippage and contact of drive belt 70 with pulleys 65 can create an electrical charge by a triboelectric effect, conductive pulleys 65 permit the flow of electrical charge to ground 60 before the charge builds to a voltage that can create a device-damaging ESD event. In one embodiment of the present invention, pulleys 65 are fabricated from a polyamide nylon 6,6 resin with mineral filler, and about 1% to about 5% by weight of conductive microfibers. As previously discussed, the low percentage addition of conductive microfibers permits the conveyor component to have sufficient electrical conductance yet retain other physical properties useful in a conveyor.

In another embodiment of the present invention, the triboelectric generation of electrical charge on pulleys 65 is minimized by fabricating pulleys 65 and drive belt 70 from similar materials that do not respond triboelectrically. For example, both drive belt 70 and pulleys 65 may be fabricated from a urethane material.

Further, the present invention also contemplates a conveyor apparatus which includes electrically conductive means for driving the roller shafts. The electrically conductive driving means includes, by way of non-limiting example, a substantially smooth drive belt 70 driving a substantially smooth, electrically conductive V-groove pulley 65 coupled to the roller shaft, and also contemplates a toothed drive belt driving an electrically conductive toothed pulley coupled to the roller shaft. The toothed pulley includes a series of teeth which couple to the complementary shaped teeth of the toothed drive belt.

Although the use of toothed drive belts to drive toothed pulleys is known in the art, in one embodiment of the present invention the toothed pulley is made electrically conductive, and formed from a synthetic base material mixed with conductive microfibers, carbon, or graphite. For example, the toothed pulley can be formed from a compound comprising about 40% mineral reinforcement and about 60% nylon 6,6, and which is sold under the designation Vydyne R-100 by the Monsanto Company, to which about 3–5% conductive microfibers are added. Triboelectric charges which build up by any slipping or sliding action between the toothed belt and the toothed pulley are conducted to ground through the toothed pulley.

As shown in FIG. 1, conveyor 20 also includes a cover 90 that locates on a portion of bushing holder 50. Cover 90 is preferably fabricated from a conductive plastic or a conductive metal such as aluminum or stainless steel so as to provide electromagnetic interference shielding of the electric field created by the driving means, such as the interface of pulleys 65 with belt 70. Cover 90 also provides a second path to ground 60 for objects being conveyed along surface path 40 that come into contact with cover 90.

In another embodiment of the present invention, a conveyor 120 with aerodynamic features useful in a clean room is depicted in FIG. 2. The aerodynamic features and other clean room related aspects of conveyor 120 are described in more detail in copending U.S. patent application Ser. No. 09/165,515. Flanged rollers 30' with a conveying surface 40' support an object 21 being conveyed, object 21 containing one or more devices susceptible to ESD.

FIG. 2 further illustrates an embodiment of the present invention in which the conveyor includes only two rollers supporting the conveyed object. As illustrated, the two flanged rollers 30' are driven by a single roller shaft. A conveyed object 21, which as shown is a carrier of an electrostatic sensitive device, is supported by the two rollers. For those embodiment of the present invention utilizing an electrically conductive carrier, only a single electrically conductive roller 30' can be in contact with the carrier, although a preferred embodiment of the invention illustrated in FIG. 2 utilizes two electrically conductive rollers 30'.

Further, for those embodiments where the conveyed object is sufficiently conductive, the present invention contemplates that fewer than all of the rollers supported on a roller shaft are electrically conductive. For example, in the configuration depicted in FIG. 2, only a single roller 30' needs to be conductive with a resistance preferably from about $1\times10^5$ ohms to about $2\times10^6$ ohms.

In yet another embodiment of the present invention, a conveyor 220 incorporating ergonometric dimension and features is depicted in FIG. 3. Conveyor 220, and related ergonomically arranged conveyors, are described in more detail in co-pending U.S. patent application Ser. No. 08/866,723. A modified static support member 55' is shown supporting a portion of the conveyor driving mechanism on one side of conveyor 220, and supporting a portion of the other side of conveyor 220. A drive motor 99 is shown which drives line shaft 75 by an arrangement of belts and pulleys known to those of ordinary skill in the art.

Figure 4:
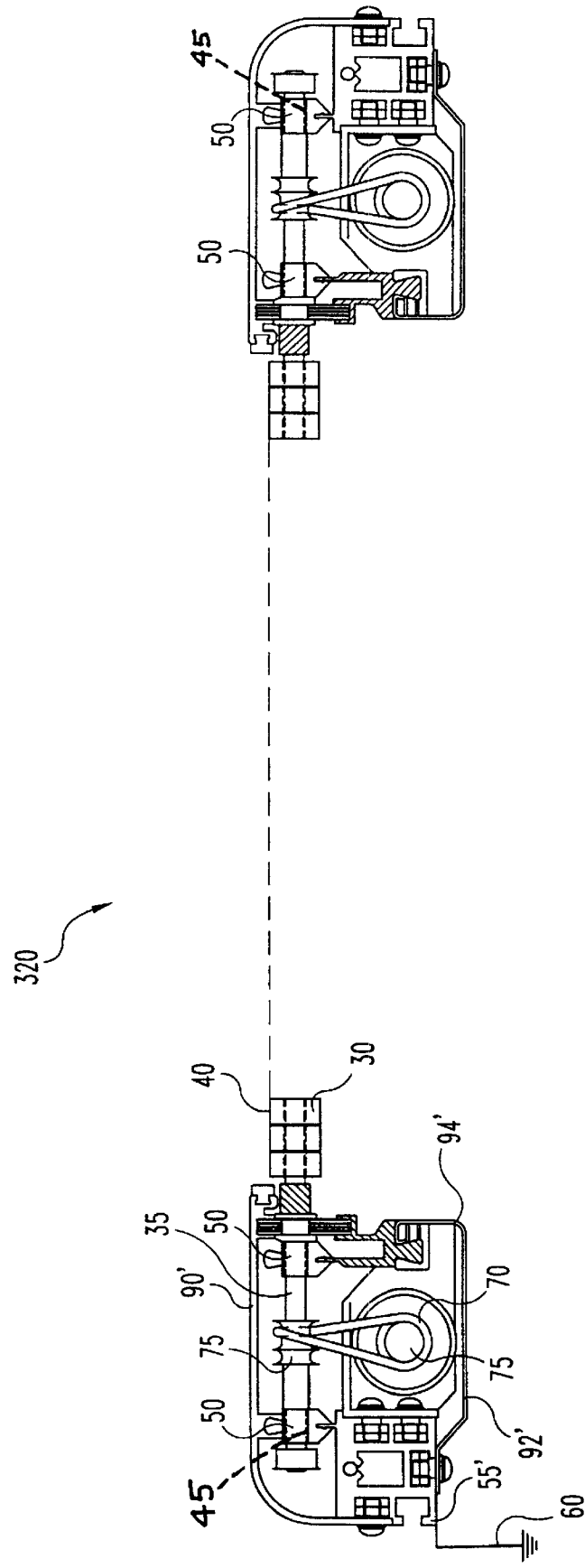
FIG. 4 is a cross sectional view of a portion of a conveyor according to another embodiment of the present invention.

Further, the present invention contemplates conveyors with drive mechanisms on each side of the conveying path, as is shown in FIG. 4. Conveyor 320, a portion of which is shown in cross sectional view, includes drive mechanisms on either side of the conveying path. Conveyor 320 is described in more detail in co-pending U.S. patent application Ser. No. 08/866,723. Each drive mechanism includes short, stub roller shafts 35" driving and supporting at least one slippable roller. Each stub roller shaft 35" is generally aligned with a stub roller shaft 35" driven from the other side of the conveyor, such that the center of the conveyor beneath the conveyed product is largely open.

Another embodiment of the present invention also includes a Faraday shield to minimize the propagation of any electrical field generated by the belt and pulley to the product being conveyed. As shown in FIG. 2, an electrically conductive enclosure 94, or Faraday shield, comprising static support member 55, electrically conductive inner cover 92, and electrically conductive upper cover 98 contain most or all of the electrical field generated by the roller shaft driving means. As shown in FIG. 3, another embodiment of the present invention includes an electrically conductive enclosure 94', or Faraday shield, comprising upper cover 90', static support member 55', side cover 91, and electrically conductive inner cover assembly 92'.

Preferably, the Faraday shields thus described are generally continuous and preferably surround drive belts 70, pulleys 65, other triboelectric generators, and active electrical devices such as drive motors and solenoids. The Faraday shield should have no or few gaps between covers and other shielding components so as to minimize leakage of any electrical fields within. In such a configuration, the Faraday shield also serves as a plenum which may be evacuated to remove particulate matter generated by the driving components of the conveyor. Those embodiments of the present invention including evacuated plenums preferably also include a foam rubber shaft seal which seals a gap between roller shaft 35 and cover 90.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus comprising:
    a conveyor adapted for moving objects, said conveyor including:
        a plurality of electrically conductive non-metallic rollers adapted for conveying an object thereon, said rollers having an outer diameter adapted for contacting the object and an inner diameter, said rollers having a first electrical resistance from the outer diameter to the inner diameter;
        a plurality of electrically conductive rotatable roller shafts for supporting said plurality of rollers, said roller shafts having an outer diameter smaller than the inner diameter of said rollers supported thereon;
        a static support member;
        a plurality of electrically conductive non-metallic bushings for rotatably supporting said plurality of roller shafts, said bushings being supported by said static support member; and
        wherein said rollers, said roller shafts, and said bushings are in electrical communication with a common electrical ground, there being a second electrical resistance from one of said roller shafts supported by one of said bushings to the common electrical ground, the second electrical resistance being less than the first electrical resistance.

2. The apparatus according to claim 1, wherein said bushings are formed from a synthetic material including conductive microfibers, graphite, or carbon.

3. The apparatus according to claim 1, wherein said rollers are formed from a synthetic material including conductive microfibers.

4. The apparatus according to claim 1, wherein the first electrical resistance is more than about one hundred thousand ohms and less than about two million ohms.

5. The apparatus according to claim 1, which further comprises:
a plurality of electrically conductive non-metallic pulleys, each of said pulleys being coupled to one of said roller shafts, said pulleys being in electrical communication with the common electrical ground; and
a plurality of drive belts, each of said drive belts driving one of said pulleys.

6. An apparatus according to claim 5, wherein said drive belts are formed from a urethane material, and said pulleys are fabricated from a synthetic material including conductive microfibers, carbon, or graphite.

7. An apparatus according to claim 5, which further comprises at least one electrically conductive cover, and wherein said pulleys and said drive belts cooperate to generate a triboelectric field, and said cover provides an electromagnetic shield to contain the triboelectric field.

8. The apparatus according to claim 1 which further comprises a plurality of electrically conductive bushing holders for supporting said plurality of bushings, and a static support member for supporting said plurality of bushing holders, said bushing holders and said static support member being in electrical communication with the common electrical ground.

9. The apparatus according to claim 1 wherein the first electrical resistance is less than about two million ohms, and the second electrical resistance is less than about one hundred thousand ohms.

10. The apparatus according to claim 9, wherein the first electrical resistance is more than about one hundred thousand ohms.

11. The apparatus according to claim 10, wherein said rollers are formed from a synthetic material including conductive microfibers.

12. The apparatus according to claim 11, which further comprises:
a plurality of electrically conductive non-metallic pulleys, each one of said pulleys being coupled to one of said roller shafts, said pulleys being in electrical communication with the common electrical ground; and
a plurality of drive belts, each of said drive belts driving one of said pulleys.

13. An apparatus according to claim 12, which further comprises at least one electrically conductive cover, and wherein said pulleys and said drive belts cooperate to generate a triboelectric field, and said cover provides an electromagnetic shield to contain the triboelectric field.

14. An apparatus comprising:
a conveyor adapted for moving an object, said conveyor including:
a plurality of electrically conductive non-metallic rollers adapted for conveying an object thereon, said rollers having an outer diameter adapted for contacting the object and an inner diameter;
a plurality of electrically conductive rotatable roller shafts adapted and configured for said plurality of rollers, said roller shafts having an outer diameter smaller than the inner diameter of said rollers supported thereon, said rollers and said roller shafts being in electrical communication with an electrical ground; and
electrically conductive means for driving the roller shafts, a portion of said driving means being in electrical communication with the electrical ground.

15. The apparatus according to claim 14 wherein said driving means comprises:
a plurality of electrically conductive non-metallic pulleys, each of said pulleys being coupled to one of said roller shafts, each said roller shaft being rotatably driven by one of said pulleys, said pulleys being in electrical communication with an electrical ground; and
a plurality of drive belts, each of said drive belts driving one of said pulleys.

16. The apparatus according to claim 15 wherein said drive belts are substantially smooth and said pulleys are substantially smooth and include at least one V-groove.

17. The apparatus according to claim 16 which further comprises a static support member and a rotatable drive shaft supported by said static support member, wherein said drive shaft drives at least one of said drive belts.

18. The apparatus according to claim 15 wherein said drive belts have a toothed surface and said pulleys have a toothed outer diameter adapted and configured for coupling with the toothed surface of said drive belts.

19. An apparatus according to claim 14, which further comprises at least one electrically conductive cover in electrical communication with the electrical ground, and wherein said driving means generates a triboelectric field, and said cover provides an electromagnetic shield to contain the triboelectric field.

20. The apparatus according to claim 19, which further comprises a static support member adapted and configured for supporting said roller shafts, wherein said static support member and said cover cooperate to form a plenum which is evacuated to remove particulate matter from said conveyor.

21. An apparatus according to claim 14, wherein each of said rollers have an outer diameter and an inner diameter, the resistance between the inner diameter and the outer diameter being more than about one hundred thousand ohms and less than about two million ohms.

22. An apparatus according to claim 21, wherein said pulleys are formed from a synthetic material comprising conductive microfibers.

23. An apparatus according to claim 22, which further comprises at least one electrically conductive cover in electrical communication with the electrical ground, and wherein said driving means generates a triboelectric field, and said cover provides an electromagnetic shield to contain the triboelectric field.

24. An apparatus comprising:
a conveyor for moving an object, said conveyor including:
at least one electrically conductive roller adapted and configured for contacting the object, said roller having an outer surface and an inner diameter, the resistance between the inner diameter and the outer surface being more than about one hundred thousand ohms and less than about two million ohms; and
at least one electrically conductive rotatable roller shaft having an outer diameter for rotatably supporting the inner diameter of said at least one roller;
wherein the electrical resistance from the outer diameter of said roller shaft to an electrical ground is less than about ten thousand ohms, and the outer surface of said at least one roller is in electrical communication with an electrical ground.

25. An apparatus according to claim 24, which further comprises:

at least one electrically conductive bushing for rotatably supporting said least one roller shaft; and a static support member for supporting said at least one bushing;

wherein said roller is in communication with an electrical ground through said roller shaft, said bushing, and said static support member.

26. An apparatus according to claim 25, wherein said bushing is formed from a synthetic material which includes conductive microfibers, carbon, or graphite.

27. The apparatus of claim 24 where the electrical resistance from the outer surface of said roller to the inner diameter of said roller is more than about three hundred thousand ohms and less than about eight hundred thousand ohms.

28. An apparatus comprising:

a conveyor for moving objects, said conveyor including:
  a plurality of electrically conductive rollers for supporting the objects; said rollers being formed from a synthetic material mixed with carbon microfibers, said roller having an outer diameter and an inner diameter, the resistance between the inner diameter and the outer diameter being more than about one hundred thousand ohms and less than about one million ohms;
  a plurality of electrically conductive rotatable roller shafts for supporting said plurality of rollers, each of said roller shafts supporting at least one said roller;
  a plurality of electrically conductive bushings adapted and configured for rotatably supporting said plurality of roller shafts, said bushings being formed from a synthetic material including conductive microfibers, carbon or graphite;
  a plurality of electrically conductive bushing holders for supporting said plurality of bushings;
  a plurality of electrically conductive non-metallic pulleys, each of said pulleys being coupled to one of said roller shafts;
  a plurality of drive belts, each of said drive belts driving one of said pulleys, said drive belts being formed from an elastomeric urethane material;
  a drive shaft for driving each said drive belt; and
  wherein said rollers, said roller shafts, said bushings, said pulleys, and said bushing holders are in electrical communication with a common electrical ground.

29. A method comprising:

providing a roller conveyor;

transporting an object on the conveyor;

generating an electrostatic charge associated with the object;

conducting the electrostatic charge from the object through a first resistance, the first resistance having a value of more than about one hundred thousand ohms and less than about two million ohms;

conducting the electrostatic charge through a second resistance after said conducting through a first resistance, the second resistance having a value of less than one hundred thousand ohms; and conducting the electrostatic charge to ground after said conducting through a second resistance.

30. The method according to claim 29, wherein said providing includes a roller conveyor having a roller shaft driven by a pulley and belt, and which further comprises:

generating a triboelectric field by the pulley and belt; and shielding the object from the triboelectric field.

31. The method according to claim 29, wherein said providing includes a roller conveyor having a roller shaft driven by a pulley and belt, and which further comprises:

generating an electrostatic charge by the pulley and the belt; and conducting the electrostatic charge generated by the pulley and belt through the pulley to ground.

* * * * *